United States Patent
Kawensky

(10) Patent No.: US 6,880,836 B2
(45) Date of Patent: Apr. 19, 2005

(54) BICYCLE TIRE CRADLE

(76) Inventor: Stephen J. Kawensky, 905 Woodward Ave., McKees Rocks, PA (US) 15136

( * ) Notice: Subject to any disclaimer, the term of this patent is extended or adjusted under 35 U.S.C. 154(b) by 313 days.

(21) Appl. No.: 09/850,307

(22) Filed: May 7, 2001

(65) Prior Publication Data
US 2002/0033584 A1 Mar. 21, 2002

Related U.S. Application Data

(60) Provisional application No. 60/233,696, filed on Sep. 19, 2000.

(51) Int. Cl.[7] .............................................. B62B 5/00
(52) U.S. Cl. ...................... 280/79.11; 280/35
(58) Field of Search ............................ 280/79.11, 74.4, 280/79.5, 79.6, 35, 79.7; 414/430, 426, 563, 537, 240, 255, 256; 211/20, 22, 23, 24

(56) References Cited

U.S. PATENT DOCUMENTS

| | | | | |
|---|---|---|---|---|
| 908,740 A | * | 1/1909 | Buell | 280/35 |
| 1,035,298 A | * | 8/1912 | Wyatt | 280/35 |
| 1,788,150 A | * | 1/1931 | Curtin | 280/35 |
| 2,484,494 A | * | 10/1949 | Ferguson | 280/35 |
| 2,718,405 A | * | 9/1955 | Casey | 280/35 |
| 3,717,357 A | * | 2/1973 | Schaefer | 280/79.11 |
| 3,735,996 A | * | 5/1973 | Rath | 280/35 |
| 3,856,322 A | * | 12/1974 | Bestehorn | 280/79.11 |
| 5,486,014 A | * | 1/1996 | Hough | 280/79.11 |
| 6,095,746 A | * | 8/2000 | Bergin | 280/79.11 |

FOREIGN PATENT DOCUMENTS

GB    2224701    * 5/1990    ................ 280/79.4

* cited by examiner

Primary Examiner—Hau Phan
(74) Attorney, Agent, or Firm—James Ray & Associates

(57) ABSTRACT

An apparatus that enables movement of a bicycle with either a damaged wheel or a flat tire. The apparatus consists of a support member which has an upper surface to engage the outside of a bicycle tire. The support member also provides a device to secure the apparatus to the disable tire and rim. The support member also provides for attaching at least one wheel thereto in order to provide rolling contact with the ground surface during the movement of the bicycle with a damaged wheel or a flat tire.

20 Claims, 3 Drawing Sheets

BICYCLE TIRE CRADLE

CROSS-REFERENCE TO RELATED APPLICATIONS

The invention described in this patent application is based on the provisional application BICYCLE FLAT TIRE CRADLE, Ser. No. 60/233,696 filed Sep. 19, 2000.

FIELD OF THE INVENTION

The present invention relates, in general, to bicycle tires and, more particularly, this invention relates to an apparatus to enable movement of a bicycle having a flat tire without having to carry such bicycle and/or riding such bicycle with such tire being deflated.

BACKGROUND OF THE INVENTION

Prior to the conception of the present invention, it has been known that when a tire becomes deflated on a bicycle it has been necessary to either push the bicycle or to ride such bicycle with the tire deflated. In the latter case such tire can become damaged beyond repair and in the former case if such tire is the rear tire it may cause injury to the person moving the bicycle due to the pedals moving as a result of the tire rotation. Such moving pedals would tend to strike the leg of such person if they were not careful. In either case this is not a desirable event.

Another alternative to riding the bicycle or pushing it would be to carry it. Depending on the distance such bicycle must be carried this may not be a viable option. Of course one could always abandon the bicycle with the thought of picking it up later. However, in this case one is risking the possibility of someone taking it.

SUMMARY OF THE INVENTION

The present invention provides an apparatus that enables movement of a bicycle having either a damaged wheel or a flat tire. The apparatus consists of a tire support member that has an upper surface for engagement with the outer surface of a tire and is secured to the tire by means that are engaged with the tire support member. The support member has at least one wheel rotatably engaged to the support member which provides rolling contact with a ground surface during the movement of the bicycle with either a damaged wheel or a flat tire.

OBJECTS OF THE INVENTION

It is, therefore, one of the primary objects of the present invention to provide an apparatus to enable movement of a bicycle having a deflated tire in a relatively safe manner without having to carry such bicycle.

Another object of the present invention is to provide an apparatus to enable movement of a bicycle having a deflated tire which can be attached to the bicycle when not in use.

Still another object of the present invention is to provide an apparatus to enable movement of a bicycle having a deflated tire which is relatively simple to operate.

Yet another object of the present invention is to provide an apparatus to enable movement of a bicycle having a deflated tire which is relatively inexpensive to manufacture.

A further object of the present invention is to provide an apparatus to enable movement of a bicycle having a deflated tire which will enable coasting the bicycle on downhill grades.

An additional object of the present invention is to provide an apparatus to enable movement of a bicycle having a deflated tire which is relatively lightweight.

In addition to the various objects and advantages of the invention which have been described above, various other objects and advantages of the invention will become more readily apparent to those persons skilled in the relevant art from the following more detailed description of the invention, particularly, when such description is taken in conjunction with the attached drawing figures and with the appended claims.

Figure 1:
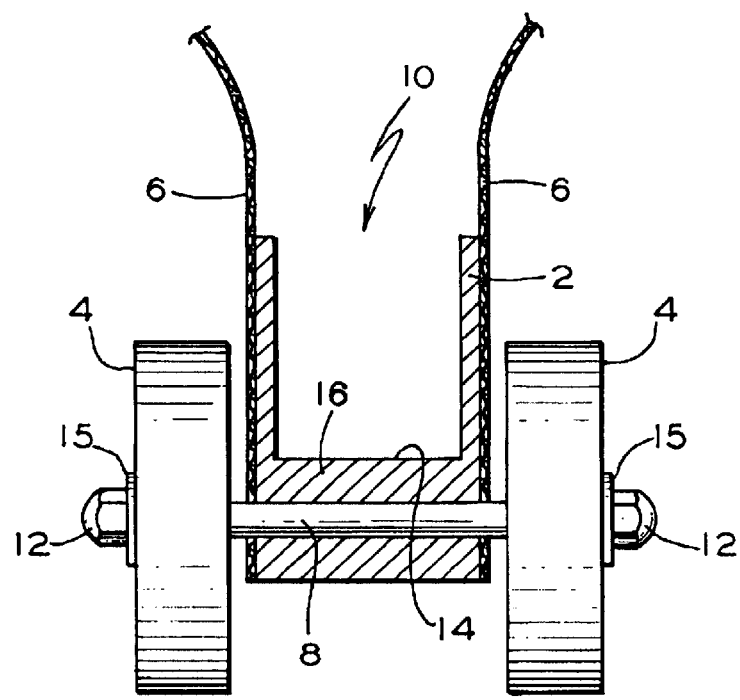
FIG. 1 is a front view of a bicycle tire cradle according to a presently preferred embodiment of the invention.
Figure 2:
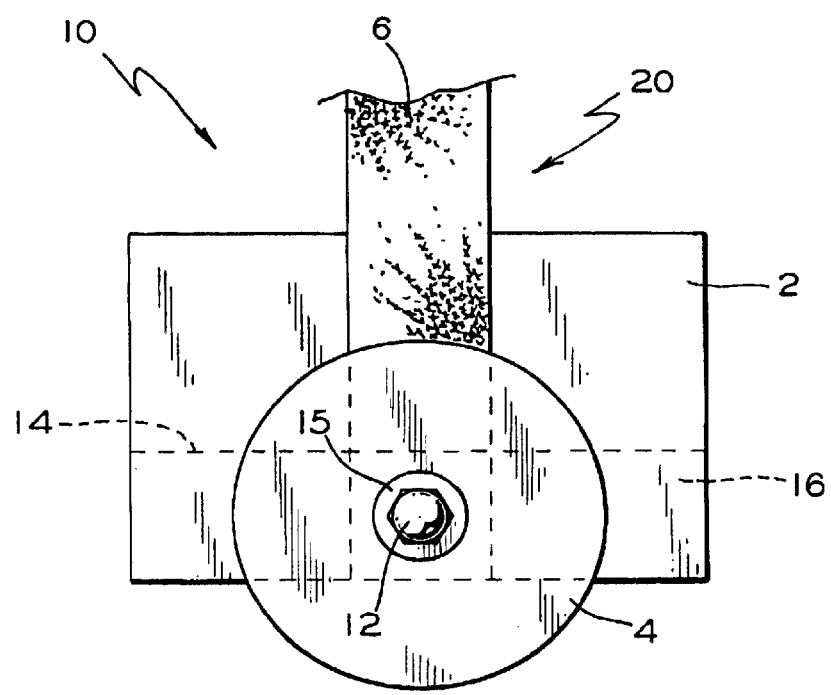
FIG. 2 is a side elevation view of the bicycle tire cradle illustrated in FIG. 1.
Figure 3:
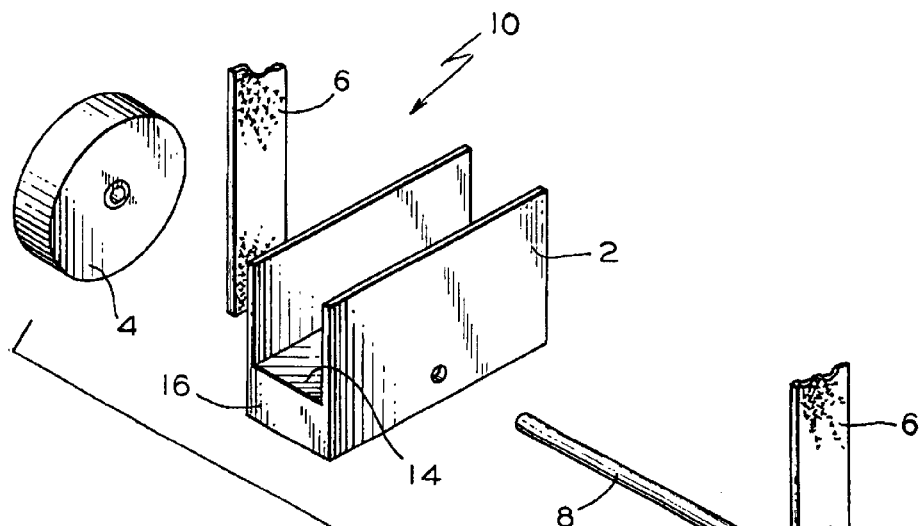
FIG. 3 is an exploded view of the bicycle tire cradle illustrated in FIGS. 1 and 2.

BRIEF DESCRIPTION OF A PRESENTLY PREFERRED AND VARIOUS ALTERNATIVE EMBODIMENTS OF THE INVENTION

Prior to proceeding to a much more detailed description of the present invention, it should be noted that, for the sake of clarity and understanding of the invention, identical components which have identical functions have been designated with identical reference numerals throughout the several views illustrated in the drawing Figures.

Reference is now directed, more particularly, to FIGS. 1 through 4. Illustrated therein is a presently preferred embodiment of the bicycle tire cradle, generally designated 10, produced according to the instant invention.

Such bicycle tire cradle 10 includes a support member 16 having an upper surface 14 for engagement by an outer surface of a tire (not shown) and one or more straps 6 to bind the disabled tire and rim to the tire support member 16. There is at least one wheel 4 rotatably engaged to the support member 16 for providing rolling contact with a ground surface during movement of such bicycle having a damaged wheel and a flat tire.

Illustrated in FIG. 1, the support member 16 is formed of either a block-like member, an L-shaped member, or a channel-like member. In the presently preferred embodiment of the invention, the support member 16 is preferably formed as a channel-like member which includes two opposing side panels 2 extending vertically above the upper surface 14 of the support member 16 to a height substantially equivalent to a combined height of a flattened tire and of a rim. In the preferred embodiment of the invention, as illustrated herein, the support member 16, when formed from a channel-like member, the channel-like member is made from either plastic or metal, preferably plastic.

There is a means, generally designated 20, engageable with the tire support member 16 for securing such tire and rim to the tire support member 16 is at least one of a strap-like member, a rope, a chain, or a clamp. Illustrated in the drawings is a strap-like member 6. Preferably, the means 20 for securing tire support member 16 to a tire and rim is a pair of strap-like members 6, each secured at first ends thereof to opposite sides of said the tire support member 16.

In the preferred embodiment of the present invention, the strap-like members 6 are made of a nylon fabric. The second end of one strap-like member 6 engages a second end of a second strap-like member 6 by at least one of Velcro®, adjustable buckle, snap, and knot, preferably Velcro®.

In a presently preferred embodiment of the invention, a pair of wheels 4 are rotatably engaged to such tire support member 16. The pair of wheels 4 are formed from one of rubber, plastic, and metal, preferably rubber and are affixed to the tire support member 16 by either an axle, a bolt, or a stud, preferably an axle 8. Each of the pair of wheels 4 includes an internal bearing (not shown) to engage axle 8.

Figure 4:
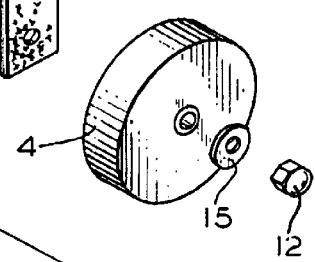
FIG. 4 is a perspective view of an alternative embodiment of a bicycle tire cradle having a single wheel.
Figure 4:
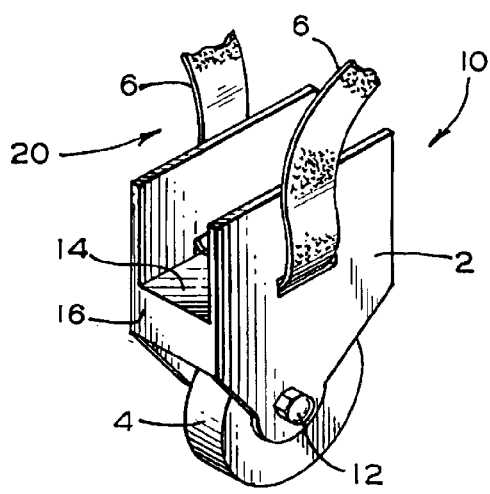
Figure 5:
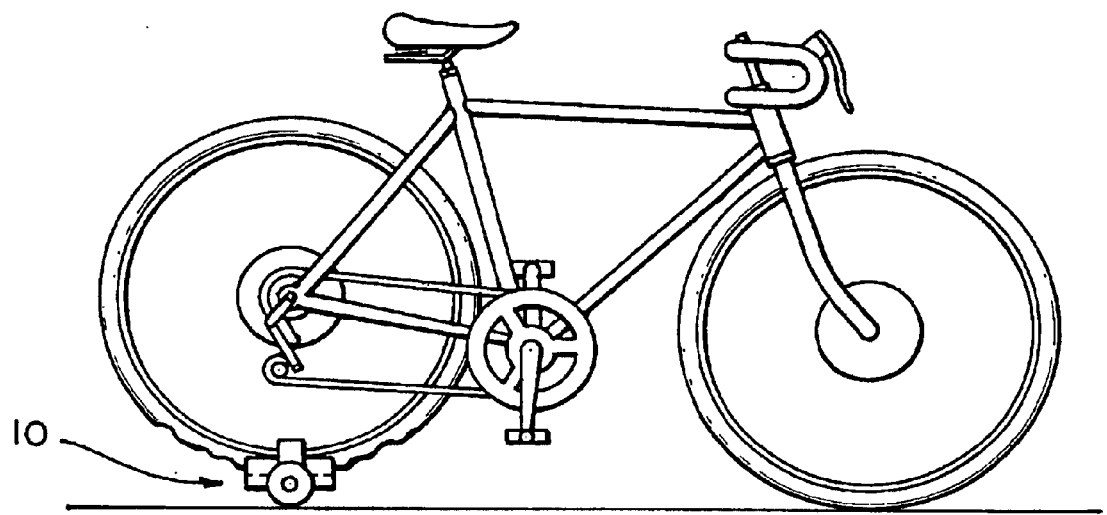
FIG. 5 is a side elevational view of a bicycle having a flat rear tire having the bicycle tire cradle of the present invention attached thereto.
Figure 5A:
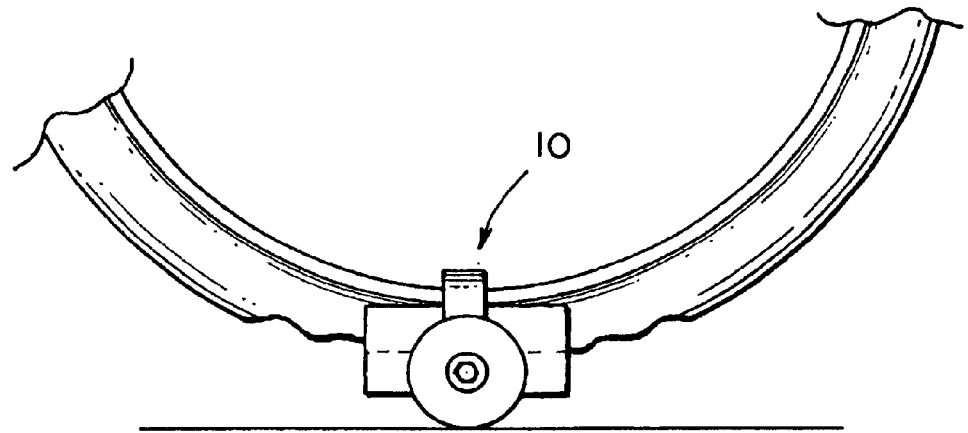
FIG. 5A is an enlarged view of the flat tire portion illustrated in FIG. 5.

Illustrated in FIG. 4 is an alternative embodiment of the present invention wherein the bicycle tire cradle 10 includes only one wheel 4.

I claim:

1. In combination with a bicycle having at least one of a damaged wheel and a flat tire mounted on said wheel, the improvement comprising an apparatus to enable movement of said bicycle, said apparatus including:
   (a) a non-rotatable tire and wheel support member having an upper surface for engagement by an outer surface of said tire and wheel;
   (b) means engageable with said non-rotatable tire and wheel support member for securing said tire and wheel to said non-rotatable tire and wheel support member; and
   (c) at least one wheel rotatably engaged to and below said upper surface of said non-rotatable tire and wheel support member for providing rolling contact with a ground surface during movement of said bicycle having said at least one of a damaged wheel and a flat tire mounted on said wheel.

2. The combination according to claim 1, wherein said non-rotatable tire and wheel support member is formed as one of a block-like member, an L-shaped member and a channel-like member.

3. The combination according to claim 2, wherein said non-rotatable tire and wheel support member is said channel-like member.

4. The combination according to claim 3, wherein said channel-like member includes two opposing side panels extending vertically above said upper surface of said non-rotatable tire and wheel support member to a height substantially equivalent to a combined height of a flattened tire and a rim.

5. The combination according to claim 4, wherein said channel-like member is formed from one of plastic and metal.

6. The combination according to claim 5, wherein said channel-like member is formed from plastic.

7. The combination according to claim 1, wherein said means engageable with said non-rotatable tire and wheel support member for securing said tire and wheel to said non-rotatable tire and wheel support member is at least one of a strap-like member, a rope, a chain, and a clamp.

8. The combination according to claim 7, wherein said means engageable with said non-rotatable tire and wheel support member for securing said tire and wheel to said non-rotatable tire and wheel support member is said strap-like member.

9. The combination according to claim 8, wherein said means engageable with said non-rotatable tire and wheel support member for securing said tire and wheel to said non-rotatable tire and wheel support member includes a pair of strap-like members, each of said pair of said strap-like members secured at first ends thereof to opposite sides of said non-rotatable tire and wheel support member.

10. The combination according to claim 9, wherein said pair of said strap-like members are formed of one of fabric, leather, and rubber.

11. The combination according to claim 10, wherein said fabric is selected from a group consisting of plastic, nylon polyester, and natural fibers.

12. The combination according to claim 11, wherein said fabric is formed of nylon.

13. The combination according to claim 9, wherein a second end of one of said pair of said strap-like members engages a second end of a second one of said pair of strap-like members by at least one of a hook and loop connecting system, adjustable buckle, snap, and knot.

14. The combination according to claim 13, wherein said second end of said one of said pair of said strap-like members engages said second end of said second one of said pair of said strap-like members by a hook and loop connecting system.

15. The combination according to claim 1, wherein said apparatus includes a pair of wheels rotatably engaged to said non-rotatable tire and wheel support member.

16. The combination according to claim 15, wherein said pair of wheels rotatably engaged to said non-rotatable tire and wheel support member are formed from one of rubber, plastic, and metal.

17. The combination according to claim 16, wherein said pair of wheels are formed of rubber.

18. The combination according to claim 15, wherein said pair of wheels rotatably engaged to said non-rotatable tire and wheel support member are affixed to said non-rotatable tire and wheel support member by one of an axle, a bolt, and a stud.

19. The combination according to claim 18, wherein said pair of wheels are affixed to said non-rotatable tire and wheel support member by an axle.

20. The combination according to claim 19, wherein said apparatus further includes a bearing rotatably engaged with said pair of wheels and with said axle.

* * * * *